(12) United States Patent
Siciak et al.

(10) Patent No.: US 10,515,620 B2
(45) Date of Patent: Dec. 24, 2019

(54) ULTRASONIC NOISE CANCELLATION IN VEHICULAR PASSENGER COMPARTMENT

(71) Applicant: FORD GLOBAL TECHNOLOGIES, LLC, Dearborn, MI (US)

(72) Inventors: Raymond C. Siciak, Ann Arbor, MI (US); Kathryn Hamilton, West Bloomfield, MI (US); Mahrdad Damsaz, Dexter, MI (US); Vivekananda Krishnamurthy, Belleville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 353 days.

(21) Appl. No.: 15/708,599

(22) Filed: Sep. 19, 2017

(65) Prior Publication Data

US 2019/0088246 A1 Mar. 21, 2019

(51) Int. Cl.
*H04B 17/00* (2015.01)
*G10K 11/178* (2006.01)

(52) U.S. Cl.
CPC ........ *G10K 11/178* (2013.01); *G10K 11/1782* (2013.01); *B60Y 2306/09* (2013.01); *G10K 2210/1281* (2013.01); *G10K 2210/1282* (2013.01); *G10K 2210/3011* (2013.01); *G10K 2210/3044* (2013.01)

(58) Field of Classification Search
None
See application file for complete search history.

(56) References Cited

U.S. PATENT DOCUMENTS

| 5,483,501 | A | 1/1996 | Park et al. |
| 5,569,854 | A * | 10/1996 | Ishida ............... G01H 11/06 |
| | | | 73/628 |
| 6,382,033 | B1 * | 5/2002 | van Bekkum ........ G01F 1/662 |
| | | | 73/861.28 |
| 6,434,239 | B1 | 8/2002 | DeLuca |
| 7,079,450 | B2 | 7/2006 | Breed et al. |
| 9,240,176 | B2 * | 1/2016 | Tzirkel-Hancock ........ |
| | | | G10K 11/002 |
| 9,368,098 | B2 | 6/2016 | Kappus et al. |
| 9,469,176 | B2 * | 10/2016 | Boyer .................. H04R 19/04 |

(Continued)

FOREIGN PATENT DOCUMENTS

| JP | 6056729 | 12/2016 | |
| WO | WO-2012016722 A2 * | 2/2012 | ............ A63H 5/00 |

*Primary Examiner* — Hovhannes Baghdasaryan
*Assistant Examiner* — Jonathan D Armstrong
(74) *Attorney, Agent, or Firm* — Frank A. MacKenzie; MacMillan, Sobanski & Todd, LLC

(57) ABSTRACT

Exposure to ultrasound energy emitted by remote object detection systems on vehicles is reduced for vehicle occupants. An automotive vehicle has a passenger cabin and a remote sensing system including ultrasonic transceivers mounted for sensing external objects. An ultrasonic microphone is disposed to sense an ultrasonic wave entering the passenger cabin at greater than 30 kHz. An antinoise processor calculates an antinoise signal adapted to at least partially cancel the ultrasonic wave at a predetermined location in the cabin. An amplifier is coupled to the processor for amplifying the antinoise signal by a predetermined gain. An ultrasonic speaker is coupled to the amplifier to project the antinoise signal into the predetermined location to attenuate the ultrasonic wave at the predetermined location.

18 Claims, 3 Drawing Sheets

(56) References Cited

U.S. PATENT DOCUMENTS

| | | | | |
|---|---|---|---|---|
| 9,595,253 B2* | 3/2017 | Inoue | | G10K 11/17883 |
| 9,919,704 B1* | 3/2018 | Kundu | | B60W 30/06 |
| 10,065,561 B1* | 9/2018 | Bastyr | | B60W 40/105 |
| 10,347,236 B1* | 7/2019 | Bastyr | | G10K 11/17854 |
| 2001/0003168 A1* | 6/2001 | Breed | | B60R 25/25 |
| | | | | 701/45 |
| 2001/0029416 A1* | 10/2001 | Breed | | B60J 10/00 |
| | | | | 701/45 |
| 2001/0053228 A1* | 12/2001 | Jones | | G10K 11/178 |
| | | | | 381/71.6 |
| 2003/0184065 A1* | 10/2003 | Breed | | B60R 21/0153 |
| | | | | 280/735 |
| 2004/0234080 A1* | 11/2004 | Hernandez | | G10K 11/178 |
| | | | | 381/71.11 |
| 2004/0264707 A1* | 12/2004 | Yang | | G10K 11/26 |
| | | | | 381/77 |
| 2006/0145537 A1* | 7/2006 | Escott | | B60R 11/02 |
| | | | | 307/10.1 |
| 2006/0215492 A1* | 9/2006 | Campbell | | G01S 7/524 |
| | | | | 367/99 |
| 2007/0107497 A1* | 5/2007 | Farrell | | G01M 3/24 |
| | | | | 73/40.5 A |
| 2007/0109137 A1* | 5/2007 | Farrel | | G01M 3/24 |
| | | | | 340/605 |
| 2007/0109138 A1* | 5/2007 | Farrell | | G01M 3/24 |
| | | | | 340/605 |
| 2007/0112528 A1* | 5/2007 | Farrell | | G01M 3/24 |
| | | | | 702/51 |
| 2007/0136088 A1* | 6/2007 | Farrel | | G01M 3/24 |
| | | | | 73/861.18 |
| 2008/0188271 A1* | 8/2008 | Miyauchi | | G10L 21/0208 |
| | | | | 455/569.2 |
| 2009/0145232 A1* | 6/2009 | Suginouchi | | G01S 7/536 |
| | | | | 73/597 |
| 2010/0001851 A1* | 1/2010 | Handa | | F17C 1/16 |
| | | | | 340/438 |
| 2010/0034398 A1* | 2/2010 | Odent | | G10K 11/178 |
| | | | | 381/71.11 |
| 2013/0039507 A1* | 2/2013 | Park | | G10K 11/1788 |
| | | | | 381/71.6 |
| 2013/0314536 A1* | 11/2013 | Frank | | H04N 5/33 |
| | | | | 348/148 |
| 2014/0226831 A1* | 8/2014 | Tzirkel-Hancock | | |
| | | | | G10K 11/002 |
| | | | | 381/71.7 |
| 2015/0104026 A1* | 4/2015 | Kappus | | G10K 11/178 |
| | | | | 381/63 |
| 2016/0192084 A1* | 6/2016 | Oliaei | | H04R 19/005 |
| | | | | 367/135 |
| 2017/0129298 A1* | 5/2017 | Lu | | B60G 17/015 |
| 2017/0213541 A1* | 7/2017 | MacNeille | | H04R 1/1083 |
| 2017/0267248 A1* | 9/2017 | Harda | | B60W 30/12 |
| 2017/0323631 A1* | 11/2017 | Close | | G10K 11/17883 |
| 2017/0330551 A1* | 11/2017 | Zafeiropoulos | | G10K 11/178 |
| 2017/0372690 A1* | 12/2017 | Valeri | | G01H 3/14 |
| 2018/0047383 A1* | 2/2018 | Hera | | G10K 11/178 |
| 2019/0088246 A1* | 3/2019 | Siciak | | G10K 11/178 |

* cited by examiner

ULTRASONIC NOISE CANCELLATION IN VEHICULAR PASSENGER COMPARTMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive noise cancellation, and, more specifically, to reducing unheard, ultrasonic sound energy impinging on vehicle occupants.

With the increasing development of driver-assistance and autonomous features, modern vehicles are accumulating a large suite of sensors to monitor and measure the driving environment. Ultrasonic sensors, which measure short-range distance using radiated ultrasonic sound waves, are inexpensive additions to an assortment of sensors typically used in passenger vehicles. They are used to augment or add redundancy to features such as parking assist, collision avoidance, and adaptive cruise control.

Ultrasonic sound energy is inaudible to passengers since it is beyond the range of human hearing. Direct application of ultrasound to the human body (e.g., as in ultrasonic imaging) is being studied for its biological effects. In the context of factory/working environments, some jurisdictions have adopted exposure limits due to potential complaints of nausea, headaches, dizziness, confusion, and stomach pain from workers using drills, welding tools, or other industrial equipment which can generate ultrasound at high volume levels. Although incidental exposure to ultrasound generated by automotive sensors does not present health risks, it may nevertheless be desirable to reduce exposure. For example, there may be potential effects on sensitive electronics brought by a passenger into the vehicle or being used by nearby persons (e.g., pedestrians) or in other vehicles. It may also be desirable to consider the potential impact on nearby animals like bats or insects, some of which depend on ultrasonic sound ranges for mating, prey, communication, and navigation.

Audible cabin noises have previously been addressed using Active Noise Cancellation (ANC) systems. Road, wind, and engine noises are reduced in order to provide a quieter passenger environment by injecting inverse or anti-noise into the passenger cabin using vehicle-mounted loudspeakers. ANC works by measuring an acoustic signal and then performing delay and phase inversion calculations for one or more speakers to output a cancelling signal, so that both sound fields reach the occupant's ear at the same time. Most ANC systems in conventional vehicles focus on cancelling very low frequency noises like those from engine idle or body "boom" noises because the corresponding low frequency wavelengths make the anti-noise easier to calculate and easier to produce. ANC systems have not been capable of addressing inaudible (e.g., ultrasonic) sound energy in passenger cabins.

SUMMARY OF THE INVENTION

In one aspect of the invention, apparatus in an automotive vehicle comprises an ultrasonic sensor disposed to sense an ultrasonic wave entering the passenger cabin at greater than 30 kHz. An antinoise processor calculates an antinoise signal adapted to at least partially cancel the ultrasonic wave at a predetermined location in the cabin. An ultrasonic speaker coupled to the processor projects the antinoise signal into the predetermined location to attenuate the ultrasonic wave at the predetermined location.

DETAILED DESCRIPTION OF PREFERRED EMBODIMENTS

Figure 1:
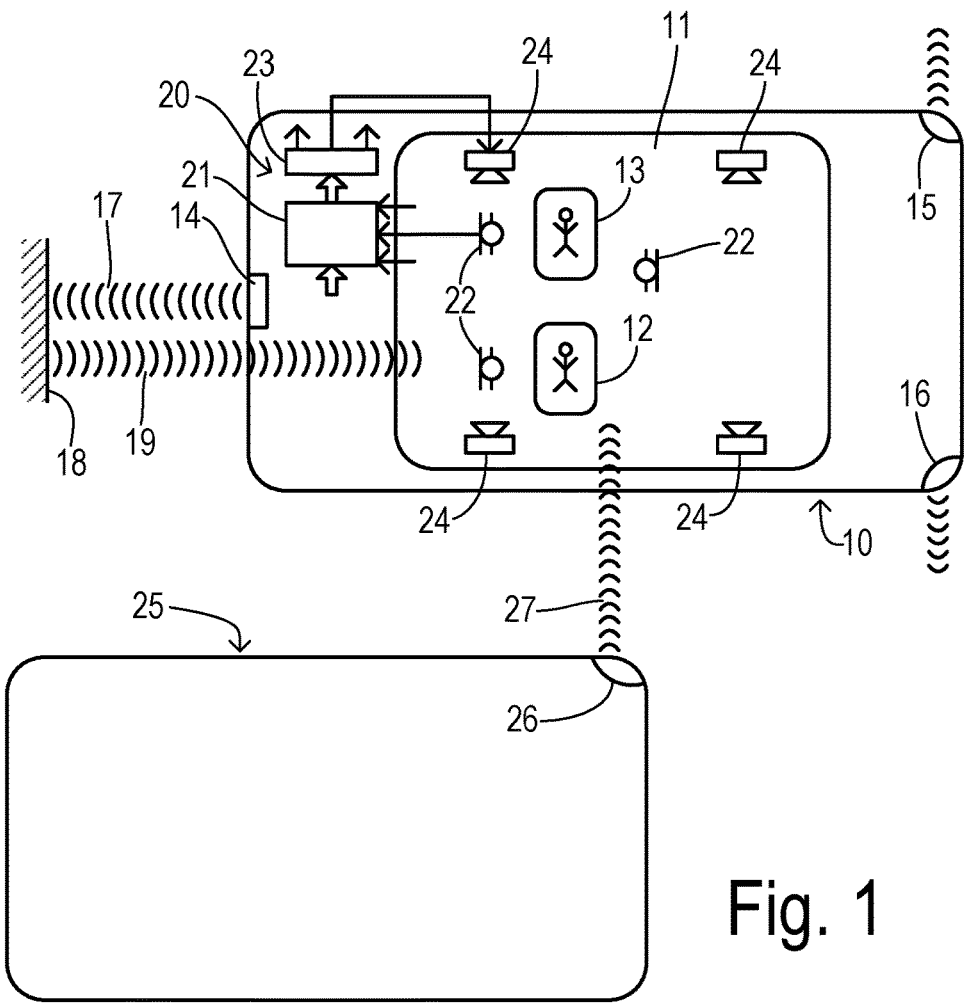
FIG. 1 is a diagram showing vehicles equipped with ultrasonic remote sensing systems and a vehicle having an ultrasonic cancelling system of the invention.

Referring to FIG. 1, a first automotive vehicle 10 is shown in the vicinity of a second automotive vehicle 25. Vehicle 10 has a passenger cabin 11 providing passenger seating locations 12 and 13 (such as a driver's seat and a front passenger's seat, respectively). As part of a remote sensing system (such as a parking assist system, collision avoidance system, backup warning system, or other advanced driver assistance system), vehicle 10 has ultrasonic transceivers 14, 15, and 16 disposed outside cabin 11 and connected to one or more processors (not shown) to perform a sonar function for detecting nearby objects using reflected ultrasonic waves. Typical ultrasonic sensors already being used commercially on vehicles transmit ultrasound at around 40 kHz to around 45 kHz, but frequencies from 30 kHz up to over 100 kHz can be used.

Ultrasonic transceiver 14 emits an ultrasonic wave 17 which is shown reflecting from an object 18, with a reflected ultrasonic wave 19 returning to transceiver 14 but also propagating into passenger cabin 11. Transceivers 14, 15, and 16 mainly project ultrasound outside vehicle 10 as shown, but leakage may be present that could allow some amount of an ultrasonic wave into cabin 11. In addition, nearby vehicle 25 has an ultrasonic transceiver 26 generating an ultrasonic wave 27, some of which enters cabin 11. Thus, passengers in seating locations 12 and/or 13 (or sensitive electronics at other locations within vehicle 10) are exposed to time-varying ultrasonic waves.

In order to attenuate the ultrasound at desired locations in vehicle 10, an active noise cancelling system 20 is provided with an antinoise processor 21 coupled to a plurality of ultrasonic sensors (i.e., microphones) 22 for sensing an ultrasonic wave at respective locations. Microphones 22 are adapted to respond to ultrasound frequencies of interest (i.e., having a response to at least some frequencies greater than about 30 kHz). Depending on the ultrasound to be cancelled, only a narrow frequency response may be necessary in order to contend with noise from typical sonar sensors operating at 40 kHz to 45 kHz. A respective microphone 22 may be preferably disposed in close proximity to each location where it may be desired to provide cancellation (e.g., in a headrest of a particular passenger seat or in a vehicle roof liner).

Antinoise processor 21 calculates an antinoise signal adapted to at least partially cancel an ultrasonic wave at one or more locations. The antinoise signal is amplified by a predetermined gain in a multi-channel amplifier 23 and sent to one or more of a set of ultrasonic speakers 24 which project the antinoise signal into the desired location(s). Even when attempting to cancel ultrasound at just one location, a plurality of speakers 24 may be active in order to each project a respective component of a multi-component antinoise signal calculated by processor 21. Speakers 24 may be distributed around cabin 11 in order to create a wide-area cancelling sound field or may be disposed close to the cancelling location (e.g., in a headrest).

Figure 2:
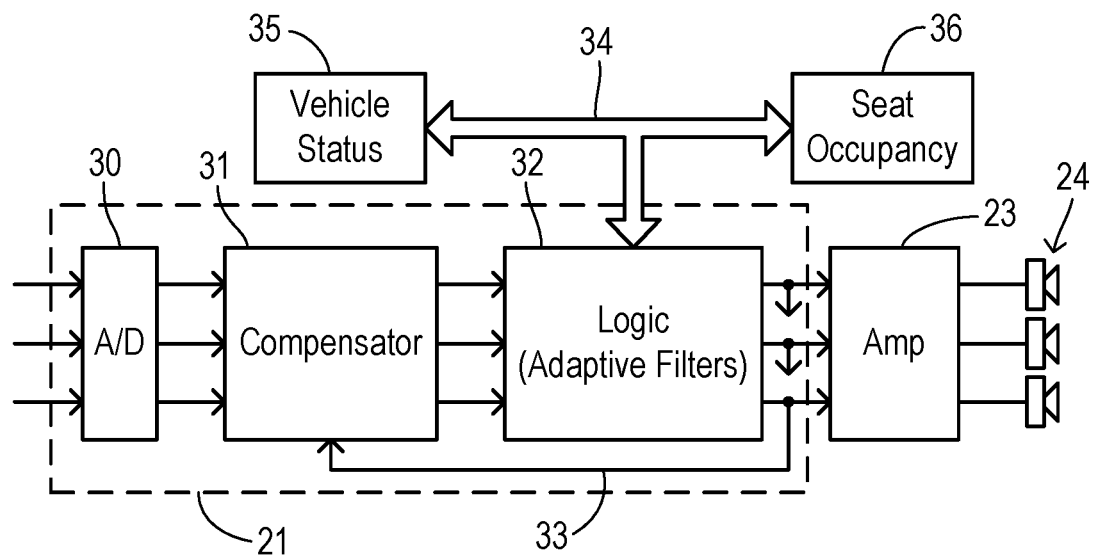
FIG. 2 is a block diagram showing one preferred embodiment of an ultrasonic cancelling system of the invention.

FIG. 2 shows an ultrasonic cancellation system in greater detail, wherein antinoise processor 21 includes a multi-channel analog-to-digital converter 30 which digitizes ultrasonic waves picked up at respective microphones. After passing through a compensator 31, the microphone signals are input to a logic block 32 which uses known algorithms and methods (e.g., adaptive filters) to generate a plurality of antinoise signals which are output to amplifier 23. The output antinoise signals are fed back to compensator 31 which is adapted to filter out any contribution of the generated antinoise signals in the ultrasonic waves sensed by the microphones, as known in the art.

Logic block 33 is coupled to a vehicle communication bus 34 (e.g., a multiplex bus) in order to receive messages from other processor/control modules in the vehicle. For example, a module 35 can provide vehicle status messages (e.g., driving status such as vehicle speed) and a seat occupancy module 36 provides messages identifying which passenger seats are occupied. These messages are used to adapt ultrasonic noise cancellation to particular vehicle states as described below.

Figure 3:
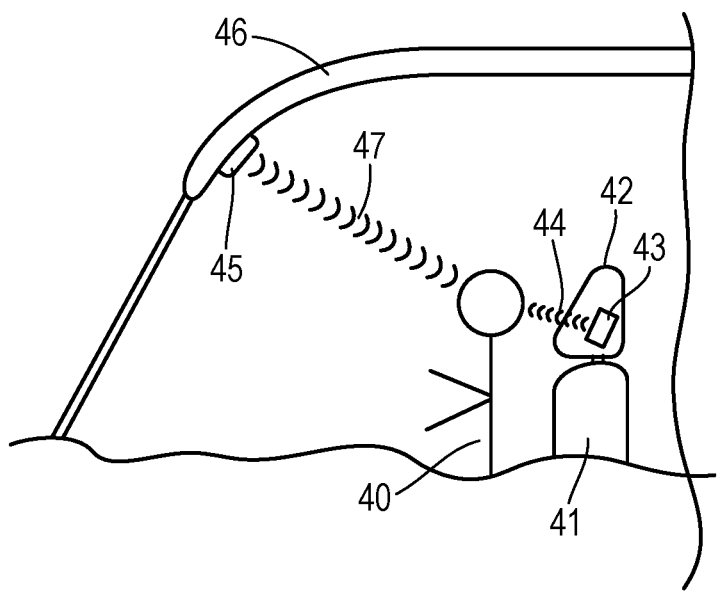
FIG. 3 depicts a side view of a front seat passenger in a vehicle showing placement locations for ultrasonic speakers.

FIG. 3 shows preferred placement of ultrasonic speakers in greater detail. A passenger (e.g., driver) 40 is seated in a seat 41 having a headrest 42. A combined speaker/microphone unit 43 is mounted within headrest 42, and is configured to project an antinoise signal 44 toward the head of passenger 40. Alternatively, a roof-mounted ultrasonic speaker 45 on a roof panel 46 projects an antinoise signal 47 toward passenger 40. Speaker 45 is preferably a directional speaker or array of speakers which emits a narrow beam of ultrasound that can more effectively cancel the ultrasonic waves at passenger 40 than when an omnidirectional speaker is used. In one embodiment, directional speaker 45 is comprised of a parametric speaker which generates multiple ultrasonic signals that combine (i.e., mix) when they interact with a receiving surface (i.e., the passenger) to locally create the desired antinoise signal.

Figure 4:
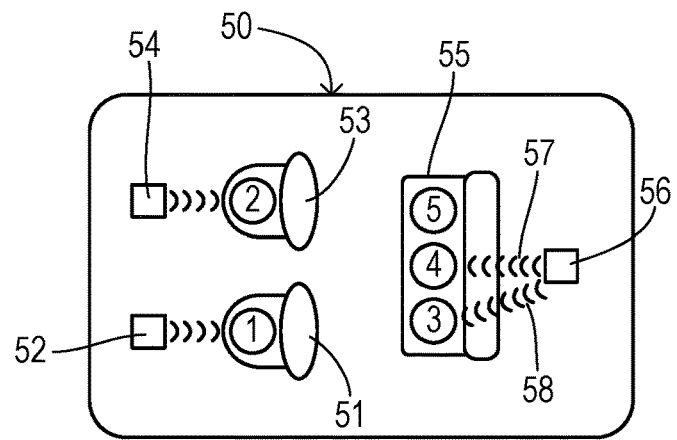
FIG. 4 is a top view showing multiple speaker locations for providing individual cancelling for respective seating locations.

FIG. 4 shows another vehicle passenger cabin 50 having front seats 51 and 53 (providing seating locations 1 and 2) and a rear bench seat 55 (providing seating locations 3, 4, and 5). A directional speaker 52 is aligned with seating location 1 and a directional speaker 54 is aligned with seating location 2. A rear directional speaker 56 may preferably be comprised of an array of subspeakers which allows its acoustic output to be steered toward a desired location (e.g., to a beam 57 toward a seating location 4 or to a beam 58 toward a seating location 3). Which speakers are active and where a steerable beam is directed may be determined according to a detected seat occupancy described above.

Figure 5:
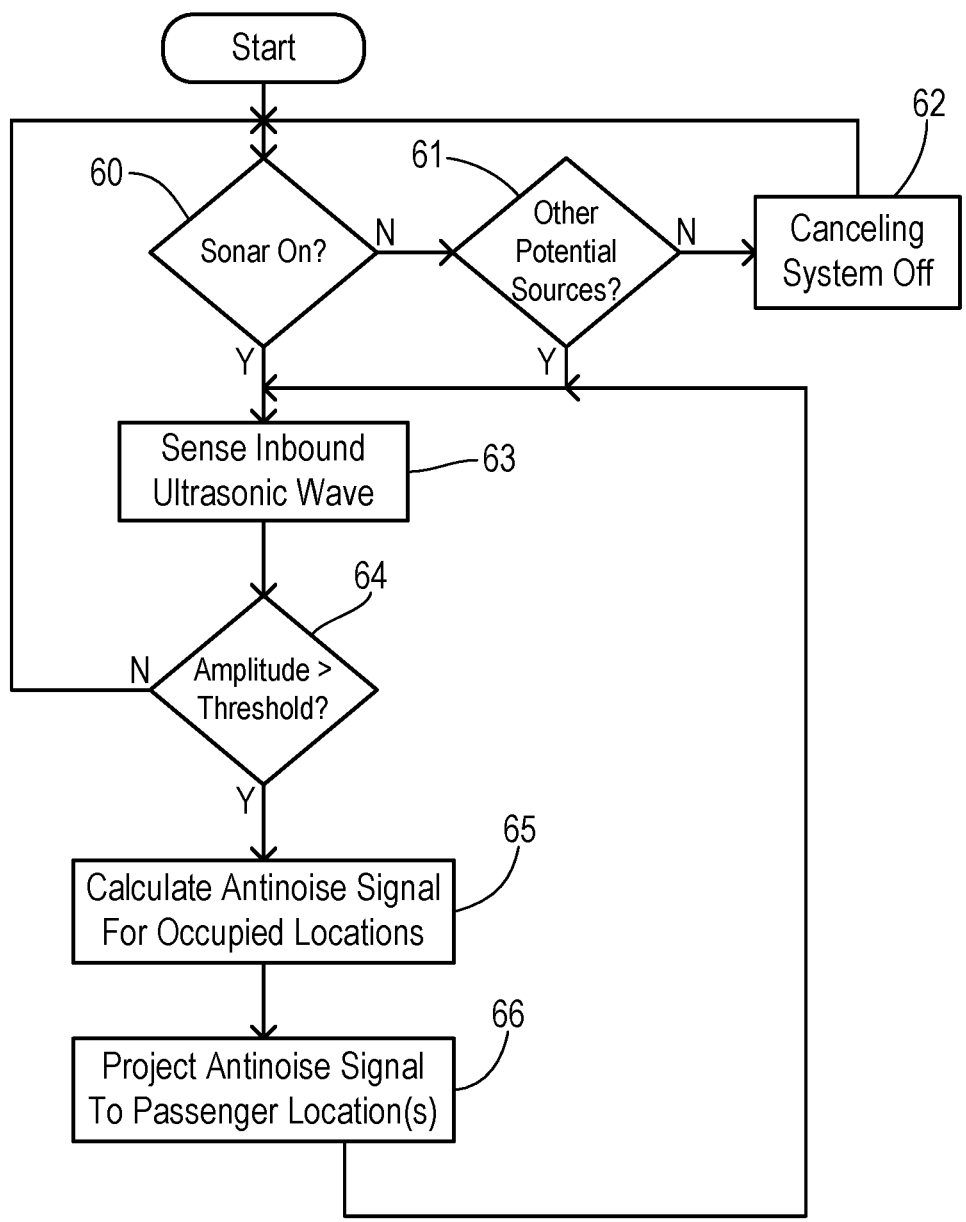
FIG. 5 is a flowchart showing one preferred method of the invention.

One preferred method of the invention is shown in FIG. 5. Upon starting, the method proceeds to check whether the on-board ultrasonic sonar sensors are active in step 60. If not, then a check is performed in step 61 to determine whether there may be other potential ultrasound sources in the vicinity. For example, when the vehicle is operating at less than a predetermined speed, it could be operating in an environment where nearby cars are emitting ultrasonic sonar pulses of their own (e.g., the vehicle is in a parking lot or on a side street). A higher rate of speed may indicate that the vehicle is being driven on a highway where it may be unlikely to receive significant ultrasonic energy from other cars. If there are no other potential sources, then the cancelling system is turned off (or remains off) in step 62 and the method begins again from the beginning.

If the result of step 60 or 61 is positive, then an inbound ultrasonic wave is sensed by the ultrasonic microphone(s) in step 63. An amplitude (e.g., sound pressure level) of the inbound ultrasonic wave is compared to a threshold in step 64. The threshold is selected to detect whether the ultrasonic noise level is high enough to warrant cancellation. If the amplitude is not above the threshold, then a return is made to step 60. Otherwise, the method proceeds to step 65 where the antinoise processor calculates an antinoise signal for occupied seating locations. In step 66, the antinoise signal(s) are projected to the respective locations so that a passenger and/or sensitive equipment receives an attenuated level of the ultrasonic wave.

What is claimed is:

1. Apparatus in an automotive vehicle, comprising:
   an ultrasonic sensor disposed to sense an ultrasonic wave entering the passenger cabin at greater than 30 kHz;
   an antinoise processor calculating an antinoise signal adapted to at least partially cancel the ultrasonic wave at a predetermined location in the cabin; and
   an ultrasonic speaker coupled to the processor to project the antinoise signal into the predetermined location to attenuate the ultrasonic wave at the predetermined location.

2. The apparatus of claim 1 further comprising an amplifier coupled between the processor and the speaker providing a predetermined gain that optimizes the attenuation of the ultrasonic wave.

3. The apparatus of claim 1 wherein the processor is adapted to compare an amplitude of the sensed ultrasonic wave to a predetermined threshold, and wherein the processor inhibits the antinoise signal if the amplitude is less than the predetermined threshold.

4. The apparatus of claim 1 wherein the processor is adapted to identify a vehicle state corresponding to a lack of potential for exposure to an ultrasonic wave, and wherein the processor inhibits the antinoise signal in response to the identified state.

5. The apparatus of claim 4 wherein the vehicle state includes an operating status of an ultrasonic transmitter carried on the vehicle outside of the passenger cabin.

6. The apparatus of claim 4 wherein the vehicle state includes a driving status of the vehicle.

7. The apparatus of claim 1 further comprising a compensator for removing a contribution of the antinoise signal projected by the ultrasonic speaker to the ultrasonic wave sensed by the ultrasonic sensor.

8. The apparatus of claim 1 further comprising a seat occupancy sensor in the passenger cabin providing a seat occupancy signal to the processor for determining the predetermined location.

9. The apparatus of claim 1 wherein the ultrasonic speaker is a directional speaker aligned with the predetermined location.

10. The apparatus of claim 9 wherein the directional speaker is a parametric speaker.

11. An automotive vehicle, comprising:
a passenger cabin;
a remote sensing system including ultrasonic transceivers mounted for sensing external objects;
an ultrasonic microphone disposed to sense an ultrasonic wave entering the passenger cabin at greater than 30 kHz;
an antinoise processor calculating an antinoise signal adapted to at least partially cancel the ultrasonic wave at a predetermined location in the cabin;
an amplifier coupled to the processor for amplifying the antinoise signal by a predetermined gain; and
an ultrasonic speaker coupled to the amplifier to project the antinoise signal into the predetermined location to attenuate the ultrasonic wave at the predetermined location.

12. The vehicle of claim 11 further comprising:
a plurality of passenger seats in the cabin; and
a seat occupancy sensing system in the passenger cabin providing a seat occupancy signal to the processor for determining the predetermined location.

13. The vehicle of claim 11 wherein the ultrasonic speaker is a directional speaker aligned with the predetermined location.

14. The vehicle of claim 13 comprising a plurality of directional speakers each receiving an antinoise signal adapted to attenuate the ultrasonic wave at a respective passenger seat.

15. The vehicle of claim 13 wherein the directional speaker is a parametric speaker.

16. A method of reducing acoustic exposure to a passenger in a vehicle, comprising the steps of:
sensing an ultrasonic wave entering a passenger cabin of the vehicle at greater than 30 kHz;
calculating an ultrasonic antinoise signal adapted to at least partially cancel the ultrasonic wave at a predetermined location in the cabin; and
projecting the ultrasonic antinoise signal into the predetermined location to attenuate the ultrasonic wave.

17. The method of claim 16 wherein the projecting step is comprised of generating a focused ultrasonic beam using a directional speaker aligned with the predetermined location.

18. The method of claim 16 wherein the directional speaker is a parametric speaker.

* * * * *